(12) United States Patent
Kageyama et al.

(10) Patent No.: US 10,340,533 B2
(45) Date of Patent: Jul. 2, 2019

(54) FUEL CELL STACK

(71) Applicant: NISSAN MOTOR CO., LTD., Yokohama-shi, Kanagawa (JP)

(72) Inventors: Kazuhiro Kageyama, Kanagawa (JP); Satomi Furukawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/745,309

(22) PCT Filed: Jul. 17, 2015

(86) PCT No.: PCT/JP2015/070557
§ 371 (c)(1),
(2) Date: Jan. 16, 2018

(87) PCT Pub. No.: WO2017/013710
PCT Pub. Date: Jan. 26, 2017

(65) Prior Publication Data
US 2019/0013528 A1    Jan. 10, 2019

(51) Int. Cl.
*H01M 8/00* (2016.01)
*H01M 8/0271* (2016.01)
*H01M 8/0267* (2016.01)
*H01M 8/0258* (2016.01)
*H01M 8/0297* (2016.01)
*H01M 8/242* (2016.01)
*H01M 8/1018* (2016.01)

(52) U.S. Cl.
CPC ....... *H01M 8/0271* (2013.01); *H01M 8/0258* (2013.01); *H01M 8/0267* (2013.01); *H01M 8/0297* (2013.01); *H01M 8/242* (2013.01); *H01M 2008/1095* (2013.01)

(58) Field of Classification Search
CPC .. H01M 8/0267; H01M 8/0271; H01M 8/242; H01M 8/0258
See application file for complete search history.

(56) References Cited

U.S. PATENT DOCUMENTS 7,396,609 B2 *   7/2008  Sugita ............... B32B 15/01
                                                        429/483
2008/0166608 A1  7/2008  Nakaji et al.
2013/0252130 A1  9/2013  Ishida et al.
(Continued)

FOREIGN PATENT DOCUMENTS

EP       1 403 951 A2    3/2004
JP       2004-119121 A   4/2004
JP       2006-269208 A   10/2006
(Continued)

*Primary Examiner* — Cynthia H Kelly
*Assistant Examiner* — Monique M Wills
(74) *Attorney, Agent, or Firm* — Foley & Lardner LLP

(57) ABSTRACT

A fuel cell in a fuel cell stack is provided with a gas seal projection and a coolant seal projection projecting from at least one of two separators toward a membrane electrode assembly. The gas seal projection and the coolant seal projection are provided with recesses serving as coolant passages on the side opposite to the membrane electrode assembly. At least one of the gas seal projection and the coolant seal projection is provided with a resistance portion for suppressing a flow of a coolant out of a power generation portion cooling portion.

6 Claims, 15 Drawing Sheets

(56) References Cited

U.S. PATENT DOCUMENTS

2015/0050577 A1 2/2015 Numao et al.
2016/0293974 A1 10/2016 Kurihara et al.

FOREIGN PATENT DOCUMENTS

| JP | 2011-222393 A | 11/2011 |
| JP | 2013-201091 A | 10/2013 |
| JP | 2015-510218 A | 4/2015 |
| JP | 2015/95315 A | 5/2015 |
| WO | WO-2009/043600 A1 | 4/2009 |
| WO | WO-2015/072096 A1 | 5/2015 |

* cited by examiner (A)

(B)

(C)

(A)

(B)

(A)

(B)

FUEL CELL STACK

TECHNICAL FIELD

The present invention relates to a fuel cell stack.

BACKGROUND ART

A conventional fuel cell stack includes fuel cell modules each including a plurality of fuel cells stacked on one another, each fuel cell including a membrane electrode assembly having a power generation portion and two separators interposing the membrane electrode assembly therebetween (for example, see Patent Literature 1).

Each fuel cell disclosed in Patent Literature 1 includes a gas introduction hole and a gas discharge hole, and a coolant introduction hole and a coolant discharge hole. The fuel cell is provided with a gas passage communicating with the gas introduction hole and the gas discharge hole.

A coolant passage communicating with the coolant introduction hole and the coolant discharge hole is provided between the fuel cells adjacent to each other in the fuel cell module.

CITATION LIST

Patent Literature

Patent Literature 1: Japanese Translation of PCT International Application Publication No. 2015-510218

SUMMARY OF INVENTION

Technical Problem

Although a reduction in size and suppression of degradation of cooling efficiency of the conventional fuel cell stack may be possible, it is preferable to achieve a further reduction in size of a fuel cell stack and suppress a reduction in cooling efficiency more reliably.

An object of the present invention is to provide a fuel cell stack with a size reduced which achieves prevention of a reduction in cooling efficiency more reliably.

Solution to Problem

A fuel cell in a fuel cell stack according to an aspect of the present invention is provided with a gas seal projection and a coolant seal projection projecting from at least one of two separators toward a membrane electrode assembly. The gas seal projection and the coolant seal projection are each provided with a recess serving as a coolant passage on the side opposite to the membrane electrode assembly. At least one of the gas seal projection and the coolant seal projection is provided with a resistance portion for suppressing a flow of a coolant out of a power generation portion cooling portion.

Advantageous Effects

According to the present invention, since the recesses formed on the rear side of the seal projections serve as the coolant passages, an extra space for providing the seal projections is not required. Accordingly, a reduction in size of the separators can be ensured, which reduces the size of the fuel cell stack.

At least one of the gas seal projection and the coolant seal projection is provided with the resistance portion for suppressing the flow of the coolant out of the power generation portion cooling portion. Accordingly, a larger amount of the coolant can flow through the power generation portion cooling portion, so as to prevent a reduction in cooling efficiency more reliably.

The present invention can provide a fuel cell stack with a size reduced which can achieves prevention of a reduction in cooling efficiency more reliably.

BRIEF DESCRIPTION OF DRAWINGS

FIG. 1A is a perspective view of the fuel cell stack, and FIG. 1B is an exploded perspective view of the fuel cell stack.

FIG. 6A is a partly-enlarged plan view of the anode-side separator, and FIG. 6 is a cross-sectional view taken along line B-B in FIG. 6A.

FIG. 8A is a partly-enlarged plan view of the anode-side separator, FIG. 8B is a cross-sectional view taken along line C-C in FIG. 8A, and FIG. 8C is a cross-sectional view taken along line D-D in FIG. 8A.

FIG. 9A is a partly-enlarged plan view of the anode-side separator, FIG. 9B is a cross-sectional view taken along line E-E in FIG. 9A, and FIG. 9C is a cross-sectional view taken along line F-F in FIG. 9A.

FIG. 11A is a partly-enlarged plan view of the anode-side separator, and FIG. 11B is a cross-sectional view taken along line G-G in FIG. 11A.

FIG. 12A is a partly-enlarged plan view of the anode-side separator, and FIG. 12B is a cross-sectional view taken along line H-H in FIG. 12A.

FIG. 13A is a partly-enlarged plan view of the anode-side separator, and FIG. 13B is a cross-sectional view taken along line I-I in FIG. 13A.

FIG. 14A is a partly-enlarged plan view of the anode-side separator, and FIG. 14B is a cross-sectional view taken along line J-J in FIG. 14A.

FIG. 15A is a partly-enlarged plan view of an anode-side separator of a first modified example, FIG. 15B is a partly-enlarged plan view of an anode-side separator of a second modified example, and FIG. 15C is a partly-enlarged plan view of an anode-side separator of a third modified example.

DESCRIPTION OF EMBODIMENTS

Figure 1:
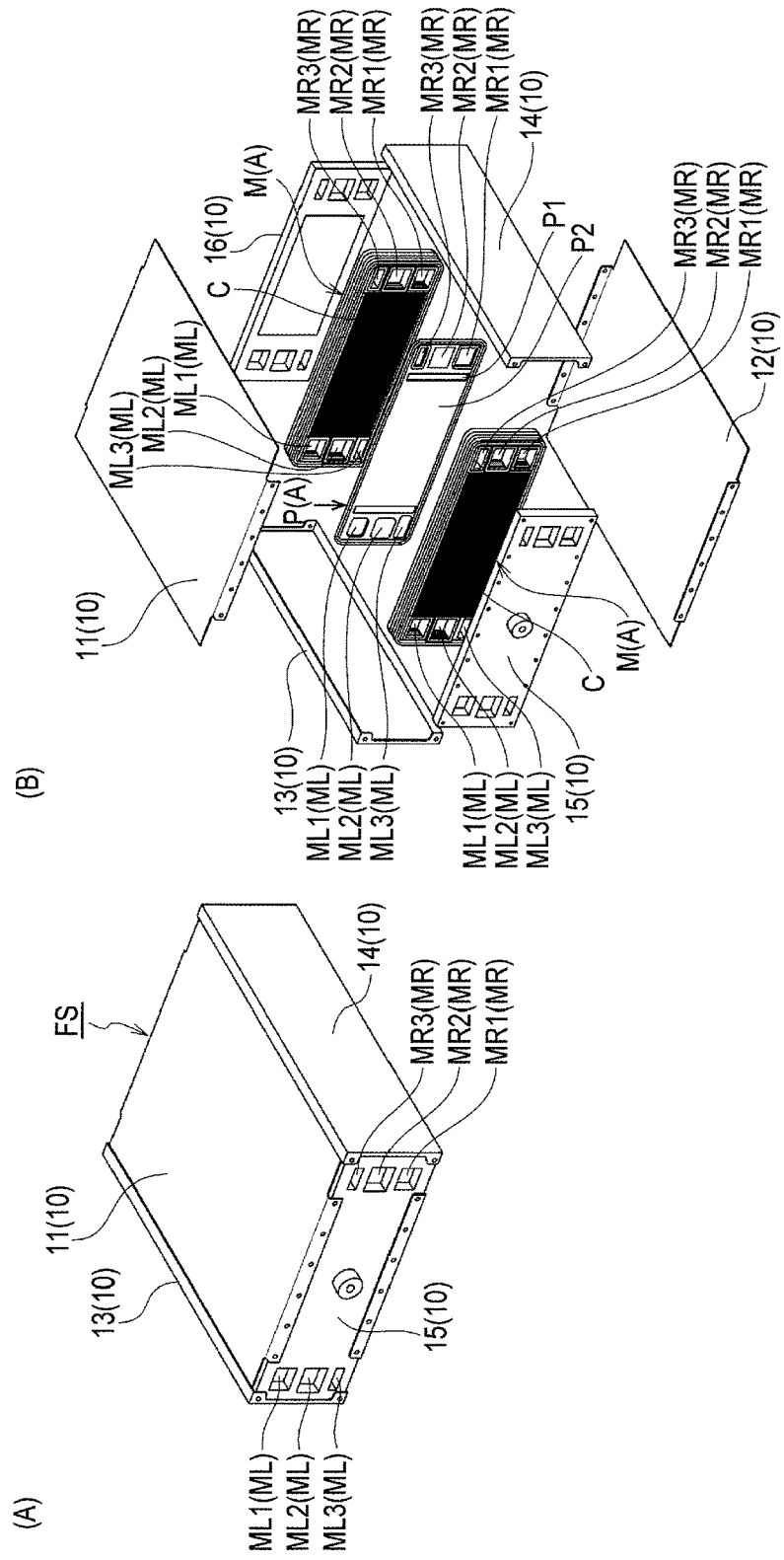
FIG. 1 is a view of a fuel cell stack according to a first embodiment of the present invention.

Hereinafter, preferred embodiments according to the present invention will be described with reference to the drawings. The following embodiments include similar elements. The similar elements are denoted by the common reference numerals, and overlapping explanations are not repeated below.

[First Embodiment]

A fuel cell stack FS according to the present embodiment includes a fuel cell module M including a plurality of fuel cells C stacked on one another, as shown in FIG. 1B.

According to the present embodiment, a plurality of fuel cell modules M having a substantially rectangular plate-like shape are provided, and a seal plate P having a substantially rectangular plate-like shape is interposed between the fuel cell modules M, M adjacent to each other.

The plural fuel cell modules M are stacked with the seal plate P interposed therebetween to form a stacked body A. Although FIG. 1B illustrates the stacked body A including two fuel cell modules M, M and one seal plate P interposed therebetween, more than two fuel cell modules M and more than one seal plate P may be stacked on one another.

The stacked body A is housed in a case 10 to form a case-integrated fuel cell stack FS as shown in FIG. 1A.

The case 10 includes fastening plates 11, 12, reinforcing plates 13, 14, and end plates 15, 16, and is formed into a substantially rectangular parallelepiped defined by the fastening plates 11, 12, the reinforcing plates 13, 14, and the end plates 15, 16.

In particular, the end plates 15, 16 are placed to cover both end surfaces of the stacked body A in the stacking direction. The fastening plates 11, 12 are placed to cover both long-side surfaces of the fuel cell modules M, and the reinforcing plates 13, 14 are placed to cover both short-side surfaces of the fuel cell modules M in the state in which the end plates 15, 16 are placed to cover the both end surfaces of the stacked body A in the stacking direction.

The fastening plates 11, 12 and the reinforcing plates 13, 14 are fastened to the end plates 15, 16 with bolts (not shown), so as to form the case 10 having a substantially rectangular parallelepiped in which the stacked body A is housed.

As shown in FIG. 1A and FIG. 1B, since the fastening direction of the plates fastened with the bolts (not shown) is the stacking direction of the stacked body A, the fuel cell modules M and the seal plate P are pressed from both sides by the end plates 15, 16 in the stacking direction of the stacked body A. The pressure-fastening to the fuel cell modules M and the seal plate P in the stacking direction of the stacked body A applies predetermined pressure to the fuel cells C, so as to ensure high gas seal performance and electrical conductivity.

Figure 5:
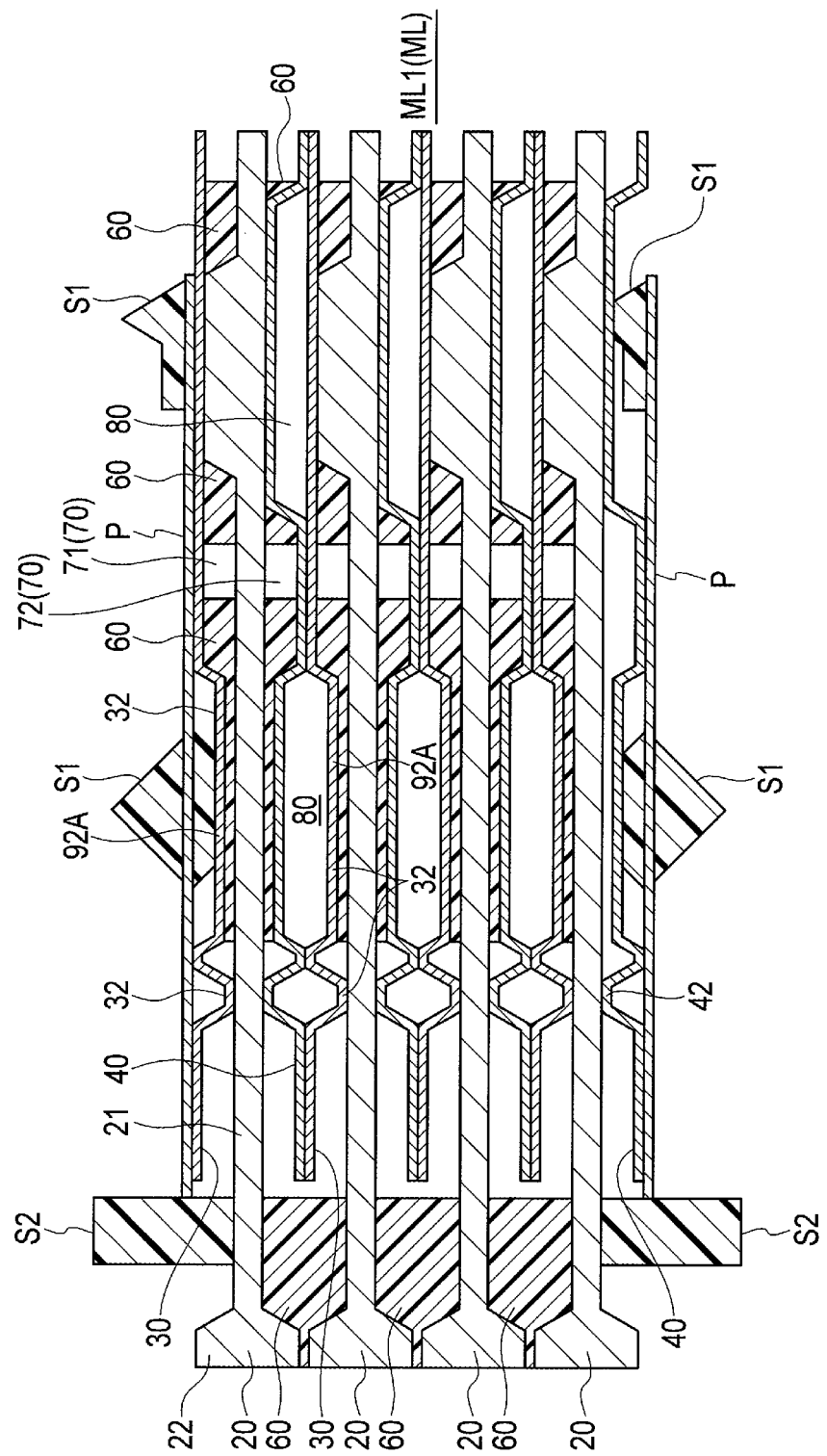
FIG. 5 is a cross-sectional view taken along line A-A in FIG. 3.

The fuel cell module M is formed such that a predetermined number of fuel cells C are stacked on one another, as described above. The outer wall surface of the fuel cell module M is composed of flanges 22 of membrane electrode assemblies 20 and adhesives 60 as described below (refer to FIG. 5). This configuration prevents water from entering the fuel cell module M and provides electrical insulation. Although FIG. 5 illustrates the fuel cell module M including four fuel cells C stacked and attached to each other, the number of fuel cells C is not limited to this illustration.

Figure 2:
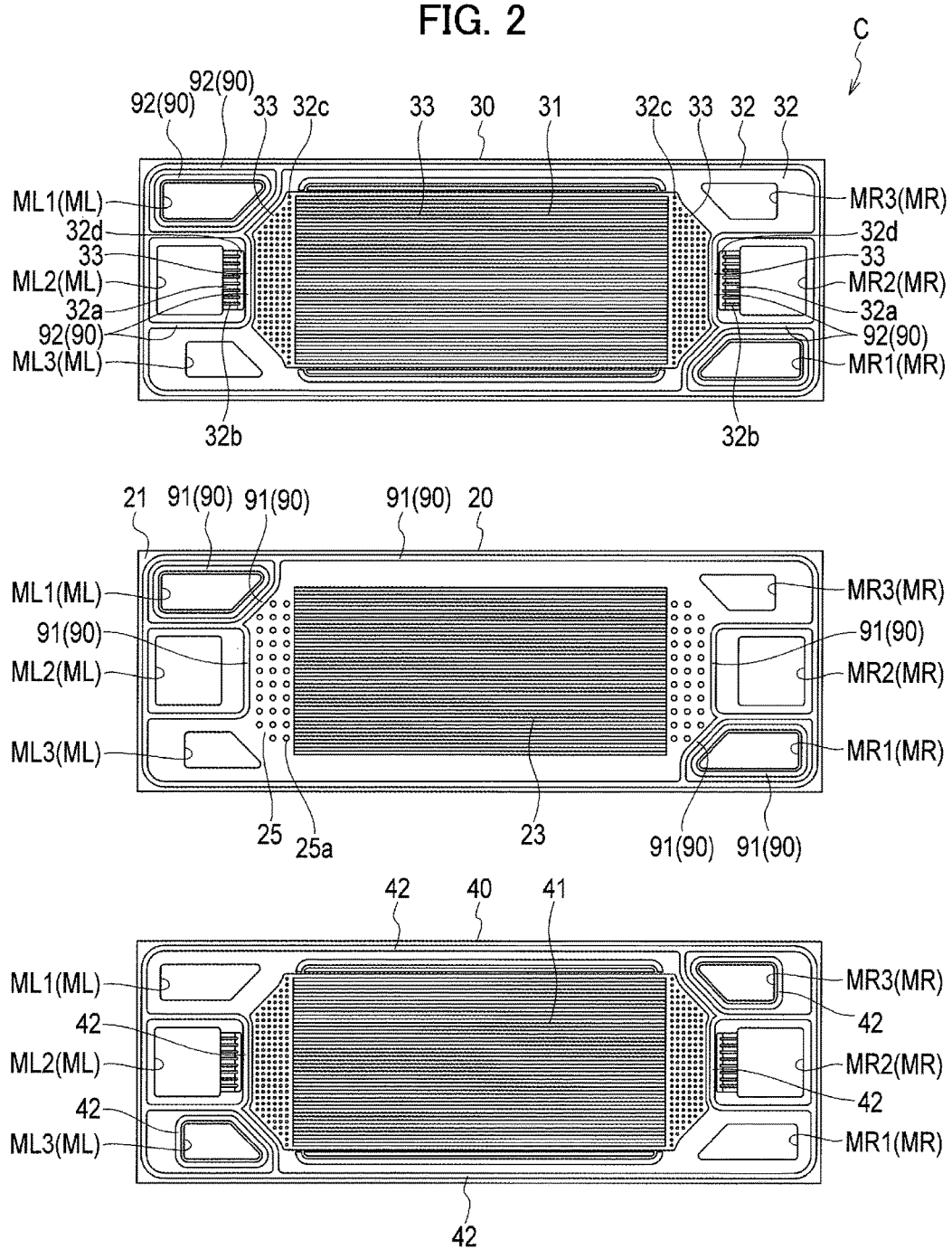
FIG. 2 is an exploded plan view of a fuel cell according to the first embodiment of the present invention.

As shown in FIG. 2, the fuel cell C includes the membrane electrode assembly 20, and two separators 30, 40 interposing the membrane electrode assembly 20 therebetween.

The membrane electrode assembly 20 has a substantially rectangular shape as viewed in the stacking direction of the fuel cells C, and includes a power generation portion 23 located in the middle and a frame portion 21 provided to surround the power generation portion 23. The frame portion 21 may be formed of resin which is an insulation member, for example. The outer circumference of the frame portion 21 is entirely provided with the flange 22 projecting on the front and rear sides of the frame portion 21.

The power generation portion 23 is also referred to as a membrane electrode assembly (MEA), and includes an electrolyte membrane formed of solid polymer and a pair of electrodes (an anode and a cathode) interposing the electrolyte membrane.

The membrane electrode assembly 20 is held such that the power generation portion 23 is covered with the two separators.

In particular, the anode-side separator 30 is arranged to cover the anode side of the power generation portion 23, and the cathode-side separator 40 is arranged to cover the cathode side of the power generation portion 23.

The anode-side separator 30 and the cathode-side separator 40 are formed such that metal plates such as stainless steel are molded by pressure into a substantially rectangular shape having a size arranged within the inner region of the flange 22 of the membrane electrode assembly 20.

The fuel cell C having the configuration described above is provided with gas passages 70 defined to allow power generation gas to pass therethrough. The present embodiment uses two kinds of gases for power generation. The two kinds of gases are a hydrogen-containing gas and an oxygen-containing gas.

The fuel cell C is thus provided with two types of gas passages 70 including a hydrogen-containing gas passage 71 through which the hydrogen-containing gas flows and an oxygen-containing gas passage 72 through which the oxygen-containing gas flows.

More particularly, as shown in FIG. 5, the hydrogen-containing gas passage 71 is defined between the anode-side surface 20a of the membrane electrode assembly 20 and a membrane electrode assembly-side surface 30b of the anode-side separator 30. The oxygen-containing gas passage 72 is defined between the cathode-side surface 20b of the membrane electrode assembly 20 and the membrane electrode assembly-side surface 40b of the cathode-side separator 40.

The hydrogen-containing gas is introduced to the hydrogen-containing gas passage 71 in the fuel cell C, so as to supply hydrogen to the anode facing the hydrogen-containing gas passage 71. The oxygen-containing gas is introduced to the oxygen-containing gas passage 72 in the fuel cell C, so as to supply oxygen to the cathode facing the oxygen-containing gas passage 72. The hydrogen supplied to the anode and the oxygen supplied to the cathode generate the power by the electrochemical reaction.

Further, coolant passages 80 through which a coolant flows are defined between the adjacent fuel cells C stacked on one another in the fuel cell module M. The coolant passage 80 is provided between the surface 30a of the anode-side separator 30 on the side opposite to the membrane electrode assembly in one fuel cell C and the surface 40a of the cathode-side separator 40 on the side opposite to the membrane electrode assembly in the other fuel cell C.

The coolant flowing through the coolant passage 80 cools the power generation portion 23. The coolant is preferably fluid capable of passing through the coolant passage 80, and water may be used as the coolant.

The fuel cell C is provided with gas introduction holes ML1, ML3 from which the power generation gas is introduced and gas discharge holes MR1, MR3 from which the power generation gas is discharged. The fuel cell C is further provided with a coolant introduction hole ML2 from which the coolant for cooling the power generation portion is introduced and a coolant discharge hole MR2 from which the coolant is discharged.

In the present embodiment, the oxygen-containing gas introduction hole ML1, the coolant introduction hole ML2, and the hydrogen-containing gas introduction hole ML3 are formed on one end in the longitudinal direction of each of the membrane electrode assembly 20 and the two separators 30, 40. The oxygen-containing gas discharge hole MR1, the coolant discharge hole MR2, and the hydrogen-containing gas discharge hole MR3 are formed on the other end in the longitudinal direction of each of the membrane electrode assembly 20 and the two separators 30, 40. The positions of the introduction holes and the discharge holes may be inverted partly or entirely.

The membrane electrode assembly 20 and the two separators 30, 40 are stacked such that the respective oxygen-containing holes ML1 communicate with each other so as to form the gas introduction hole ML1 in the fuel cell C. Similarly, the membrane electrode assembly 20 and the two separators 30, 40 are stacked such that the other introduction holes and discharge holes denoted by the common reference signs communicate with each other in the stacking direction.

The gas introduction holes ML1, ML3, the gas discharge holes MR1, MR3, the coolant introduction hole ML2, and the coolant discharge hole MR2 are thus formed in the fuel cell C.

The gas introduction holes ML1, ML3 and the gas discharge holes MR1, MR3 communicate with the gas passages 70.

In particular, the oxygen-containing gas introduction hole ML1 and the oxygen-containing gas discharge hole MR1 communicate with the oxygen-containing gas passage 72, and the hydrogen-containing gas introduction hole ML3 and the hydrogen-containing gas discharge hole MR3 communicate with the hydrogen-containing gas passage 71.

The coolant introduction hole ML2 and the coolant discharge hole MR2 communicate with the coolant passage 80.

As shown in FIG. 1, the fuel cell module M in which the fuel cells C are stacked, the seal plate P, and the end plates 15, 16 are also provided with the introduction holes ML1 to ML3 and the discharge holes MR1 to MR3. The stacked body A and the fuel cell stack FS are formed such that the respective holes denoted by the common reference signs, such as the respective introduction holes ML1, communicate with each other in the stacking direction.

The respective holes denoted by the common reference signs communicating with each other in the stacking direction serve as manifolds ML, MR, such as an oxygen-containing introduction manifold and an oxygen-containing gas discharge manifold.

Accordingly, the oxygen-containing gas is introduced into the oxygen-containing gas passage 72 from the oxygen-containing gas introduction hole ML1 serving as the oxygen-containing gas introduction manifold, the oxygen in the oxygen-containing gas is supplied to the cathode of the power generation portion 23, and excessive oxygen-containing gas is discharged through the oxygen-containing gas passage 72 from the oxygen-containing gas discharge hole MR1 serving as the oxygen-containing gas discharge manifold.

Similarly, the hydrogen-containing gas is introduced into the hydrogen-containing gas passage 71 from the hydrogen-containing gas introduction hole ML3 serving as the hydrogen-containing gas introduction manifold, the hydrogen in the hydrogen-containing gas is supplied to the anode of the power generation portion 23, and excessive hydrogen-containing gas is discharged through the hydrogen-containing gas passage 71 from the hydrogen-containing gas discharge hole MR3 serving as the hydrogen-containing gas discharge manifold.

According to the present embodiment, diffuser regions 25 through which the hydrogen-containing gas or the oxygen-containing gas flows are formed between the respective manifolds ML, MR and the power generation portion 23 in the membrane electrode assembly 20. The diffuser regions 25 are provided with a plurality of projections 25a having a truncated cone-like shape at predetermined intervals. The diffuser regions 25 are provided between the membrane electrode assembly 20 and the respective separators 30, 40, namely, provided on both sides of the membrane electrode assembly 20.

The coolant is introduced to the coolant passage 80 from the coolant introduction hole ML2 serving as the coolant introduction manifold so that the coolant flowing through the coolant passage 80 cools the power generation portion 23. The coolant flowing through the coolant passage 80 is then discharged from the coolant discharge hole MR2 serving as the coolant discharge manifold.

According to the present embodiment, the fuel cell C is provided with seal portions 90 to prevent the movement of the power generation gas and the coolant.

In particular, the seal portions 90 formed in the fuel cell C prevent the respective gases for power generation from being mixed together or prevent the respective gases and the coolant from being mixed together in the respective passages.

According to the present embodiment, the seal portions 90 are provided such that adhesive seal materials 91 formed on the membrane electrode assembly 20 come into contact with seal projections 92 projecting from at least one of the separators 30, 40 toward the membrane electrode assembly 20.

The adhesive seal materials 91 are typically, but not necessarily, made of thermosetting resin such as olefin rein.

According to the present embodiment, the seal projections 92 are provided with recesses 33a defining the coolant passages 80 on the side opposite to the membrane electrode assembly 20.

The seal portions 90 according to the present embodiment are described in detail below with reference to FIG. 3 and FIG. 4.

Figure 3:
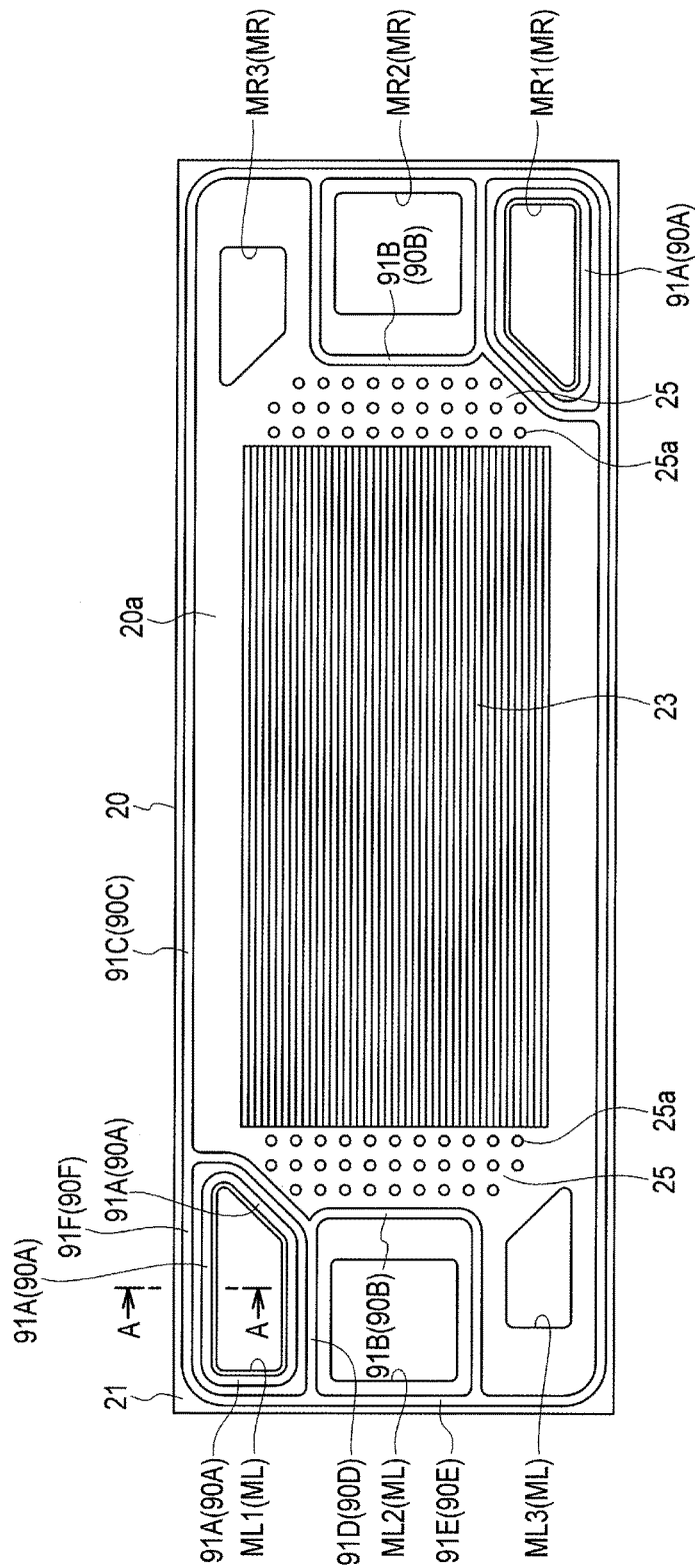
FIG. 3 is a plan view of a membrane electrode assembly according to the first embodiment of the present invention.

As shown in FIG. 3, the adhesive seal materials 91 serving as part of the seal portions 90 are formed on the surface of the membrane electrode assembly 20. According to the present embodiment, the adhesive seal materials 91 are formed on both surfaces (the anode-side surface 20a and the cathode-side surface 20b) of the membrane electrode assembly 20.

FIG. 3 illustrates the adhesive seal materials 91 formed on the anode-side surface 20a of the membrane electrode assembly 20. The adhesive seal materials 91 formed on the cathode-side surface 20b of the membrane electrode assembly 20 differs from those shown in FIG. 3 in that gas seal materials 91A described below are formed not around the oxygen-containing gas introduction hole ML1 and the oxygen-containing gas discharge hole MR1 but around the hydrogen-containing gas introduction hole ML3 and the hydrogen-containing gas discharge hole MR3.

As shown in FIG. 3, the adhesive seal materials 91 include the gas seal materials 91A surrounding the oxygen-containing gas introduction hole ML1 and the oxygen-containing gas discharge hole MR1. According to the present embodiment, the gas seal materials 91A surround the oxygen-containing gas introduction hole ML1 and the oxygen-containing gas discharge hole MR1 into a double layer in order to increase the gas sealing performance.

As shown in FIG. 3, the adhesive seal materials 91 include coolant seal materials 91B surrounding the coolant introduction hole ML2 and the coolant discharge hole MR2.

As shown in FIG. 3, the adhesive seal materials 91 include a periphery seal material 91C surrounding the outer periphery of the anode-side surface 20a of the membrane electrode assembly 20.

A part common to the outline of the gas seal material 91A and the outline of the coolant seal material 91B adjacent to each other is defined as a common seal material 91D.

A part common to the outline of the coolant seal material 91B and the outline of the periphery seal material 91C adjacent to each other is defined as a common seal material 91E. A part common to the outline of the gas seal material 91A and the outline of the periphery seal material 91C adjacent to each other is defined as a common seal material 91F.

The common part in the adhesive seal materials 91 serving as both the coolant seal material 91B and the periphery seal material 91C can reduce the region defined by the adhesive seal materials 91, so as to reduce the size of the membrane electrode assembly 20.

Figure 4:
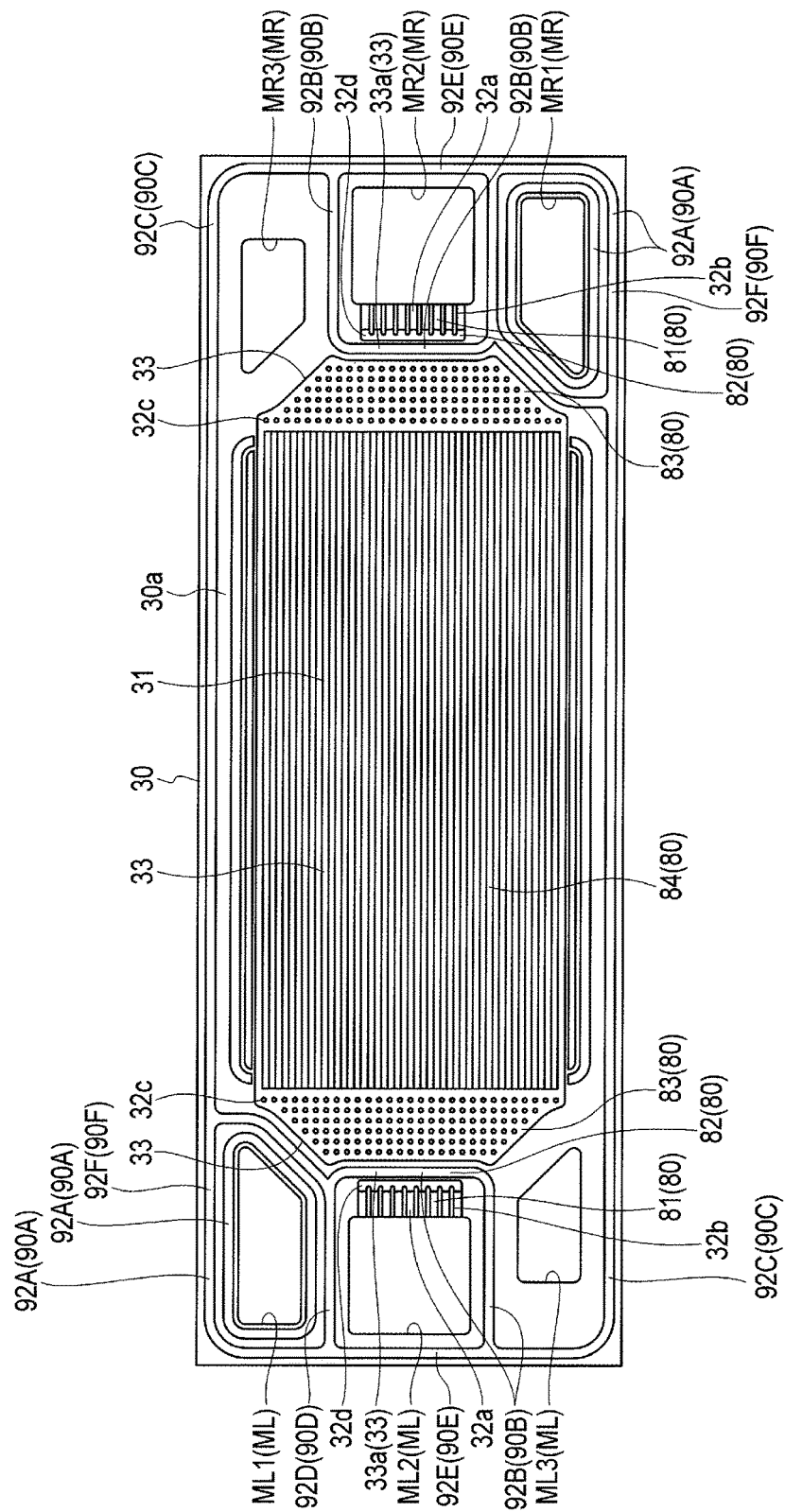
FIG. 4 is a plan view of an anode-side separator according to the first embodiment of the present invention.

As shown in FIG. 4, the anode-side separator 30 is provided with the seal projections 92 serving as part of the seal portions 90 on the membrane electrode assembly-side surface 30b. The seal projections 92 project from the anode-side separator 30 toward the membrane electrode assembly 20 so as to provide the recesses 33a defining the coolant passages 80 on the side (on the surface 30a side) opposite to the membrane electrode assembly 20.

FIG. 4 illustrates the seal projections 92 formed on the anode-side separator 30. The seal projections 92 formed on the cathode-side separator 40 differs from those shown in FIG. 4 in that gas seal projections 92A described below are provided not around the oxygen-containing gas introduction hole ML1 and the oxygen-containing gas discharge hole MR1 but around the hydrogen-containing gas introduction hole ML3 and the hydrogen-containing gas discharge hole MR3.

As shown in FIG. 4, the seal projections 92 include the gas seal projections 92A surrounding the oxygen-containing gas introduction hole ML1 and the oxygen-containing gas discharge hole MR1. According to the present embodiment, the gas seal projections 92A surround the oxygen-containing gas introduction hole ML1 and the oxygen-containing gas discharge hole MR1 into a double layer in order to increase the gas sealing performance.

As shown in FIG. 4, the seal projections 92 include coolant seal projections 92B surrounding the coolant introduction hole ML2 and the coolant discharge hole MR2.

As shown in FIG. 4, the seal projections 92 include a periphery seal projection 92C surrounding the outer periphery of the anode-side separator 30.

A part common to the outline of the gas seal projection 92A and the outline of the coolant seal projection 92B adjacent to each other is defined as a common seal projection 92D.

A part common to the outline of the coolant seal projection 92B and the outline of the periphery seal projection 92C adjacent to each other is defined as a common seal projection 92E. A part common to the outline of the gas seal projection 92A and the outline of the periphery seal projection 92C adjacent to each other is defined as a common seal projection 92F.

The common part in the adhesive seal projections 92 serving as both the coolant seal material 91B and the periphery seal projection 92C can reduce the region defined by the seal projections 92, so as to reduce the size of the anode-side separator 30.

The seal projections 92 come into contact with the adhesive seal materials 91 to form the seal portions 90 when the anode-side separator 30 is stacked on the anode-side surface 20a of the membrane electrode assembly 20.

More particularly, the gas seal projections 92A come into contact with the gas seal materials 91A to form the gas seal portions 90A. The coolant seal projections 92B come into contact with the coolant seal materials 91B to form the coolant seal portions 90B, The periphery seal projection 92C come into contact with the periphery seal material 91C to form the periphery seal portion 90C. The common seal projections 92D, 92E, and 92F come into contact with the common seal materials 91D, 91E, and 91F to form the common seal portions 90D, 90E, and 90F, respectively.

According to the present embodiment, the seal portions 90 formed on the anode-side surface 20a of the membrane electrode assembly 20 include the gas seal portions 90A for preventing the oxygen-containing gas from flowing out of the oxygen-containing gas introduction hole ML1, the oxygen-containing gas discharge hole MR1, and the oxygen-containing gas passage 72. The seal portions 90 formed on the anode-side surface 20a of the membrane electrode assembly 20 also include the coolant seal portions 90B for preventing the coolant from flowing into the space between the separator 30 and the membrane electrode assembly 20. The gas seal portions 90A and the coolant seal portions 90B each include the portions corresponding to the common seal portions 90D, 90E, and 90F.

Accordingly, the passage is formed through which the oxygen-containing gas is supplied between the membrane electrode assembly 20 and the cathode-side separator 40 from the manifold ML via the oxygen-containing gas introduction hole ML1 and discharged to the manifold MR via the oxygen-containing gas discharge hole MR1.

The cathode-side surface 20b of the membrane electrode assembly 20 is provided with gas seal portions (not shown) for preventing the hydrogen-containing gas from flowing out of the hydrogen-containing gas introduction hole ML3, the hydrogen-containing gas discharge hole MR3, and the hydrogen-containing gas passage 71. The cathode-side surface 20b of the membrane electrode assembly 20 is also provided with coolant seal portions (not shown) for preventing the coolant from flowing into the space between the separator 40 and the membrane electrode assembly 20.

Accordingly, the passage is formed through which the hydrogen-containing gas is supplied between the membrane electrode assembly 20 and the anode-side separator 30 from the manifold ML via the hydrogen-containing gas introduction hole ML3 and discharged to the manifold MR via the hydrogen-containing gas discharge hole MR3.

Further, the passage is formed through which the coolant is supplied between the anode-side separator 30 and the cathode-side separator 40 from the manifold ML via the coolant introduction hole ML2 and discharged to the manifold MR via the coolant discharge hole MR2. The coolant seal portions 90B also have a function as a gas seal for preventing the power generation gas from flowing out of the coolant introduction hole ML2 and the coolant discharge hole MR2.

The seal portions 90 formed as described above thus prevent the power generation gas and the coolant from flowing out of the fuel cell stack FS.

According to the present embodiment, as described above, the seal portions 90 include the adhesive seal materials 91 and the seal projections 92 so as to seal the separators 30, 40 and the membrane electrode assembly 20 in close contact with each other. Accordingly, a reduction in sealing performance can be prevented when the pressure of the power generation gas or the coolant is applied to the seal portions 90, so as to seal the separators 30, 40 and the membrane electrode assembly 20 more reliably.

As shown in FIG. 5, the adhesive seal material 60 is provided between the respective membrane electrode assemblies 20 to bond the frame portions 21 at the outer circumferences of the membrane electrode assemblies 20. The adhesive seal material 60 is a seal formed between the respective frame portions 21 at the outer circumferences of the membrane electrode assemblies 20. As shown in FIG. 5, the membrane electrode assembly 20 has a larger size than the separators 30, 40, and the outer edge of the frame portion 21 protrudes from the separators 30, 40.

The outer edge of the frame portion 21 is provided with the flange 22 projecting from the front and rear sides of the frame portion 21. The flange 22 is provided so that the thickness at the outer edge of the frame portion 21 is substantially the same as the distance between the membrane electrode assemblies 20 adjacent to each other. The respective outer edges are bonded together by the adhesive seal material 60 serving as an outer edge seal capable of preventing a liquid such as rainwater from entering through the outer edges.

As shown in FIG. 5, the seal plate P is interposed between the fuel cell modules M, M, and a pressure seal member S1 is provided between the seal plate P and the recessed portion of the respective separators 30, 40. Further, a pressure seal member S2 is provided between the seal plate P and the outer circumference of the membrane electrode assembly 20 at which the seal material is provided.

The pressure seal members S1, S2 are formed of a rubber material such as silicone rubber and bonded to the seal plates P. The separators 30, 40 and the pressure seal members S1, S2 are not bonded, or bonded with weaker bonding force than the bonding force between the seal plates P and the pressure seal members S1, S2.

The seal members S1 are arranged in the coolant passages 80 provided between the seal plates P and the respective separators 30, 40, so as to absorb the displacement of the fuel cells C in the stacking direction due to swelling or thermal expansion of the membrane electrode assemblies 20.

A base plate P1 of the seal plate P is provided with a pressure loss adjustment portion P2 (refer to FIG. 1B).

As described above, the coolant passages 80 through which the coolant flows are defined between the fuel cells C adjacent to each other stacked in the fuel cell module M. According to the present embodiment, the coolant passages 80 and the gas passages 70 are defined such that the separators 30, 40 are provided with recessed and projecting portions 32, 42.

The recesses 33 provided in the separator 30 serve as the coolant passages 80 by which the coolant introduction hole ML2 and the coolant discharge hole MR2 communicate with each other.

According to the present embodiment, the seal projections 92 are provided with the recesses 33 (the recesses 33a) on the side opposite to the membrane electrode assembly 20. The recesses 33a provided on the rear side of the seal projections 92 also serve as part of the coolant passages 80. The coolant passages 80 thus include the common portions common to the seal projections 92 serving as part of the seal portions 90. This configuration can reduce the size of the separators as compared with the case in which the coolant passages 80 are formed separately from the seal portions 90.

Figure 6:
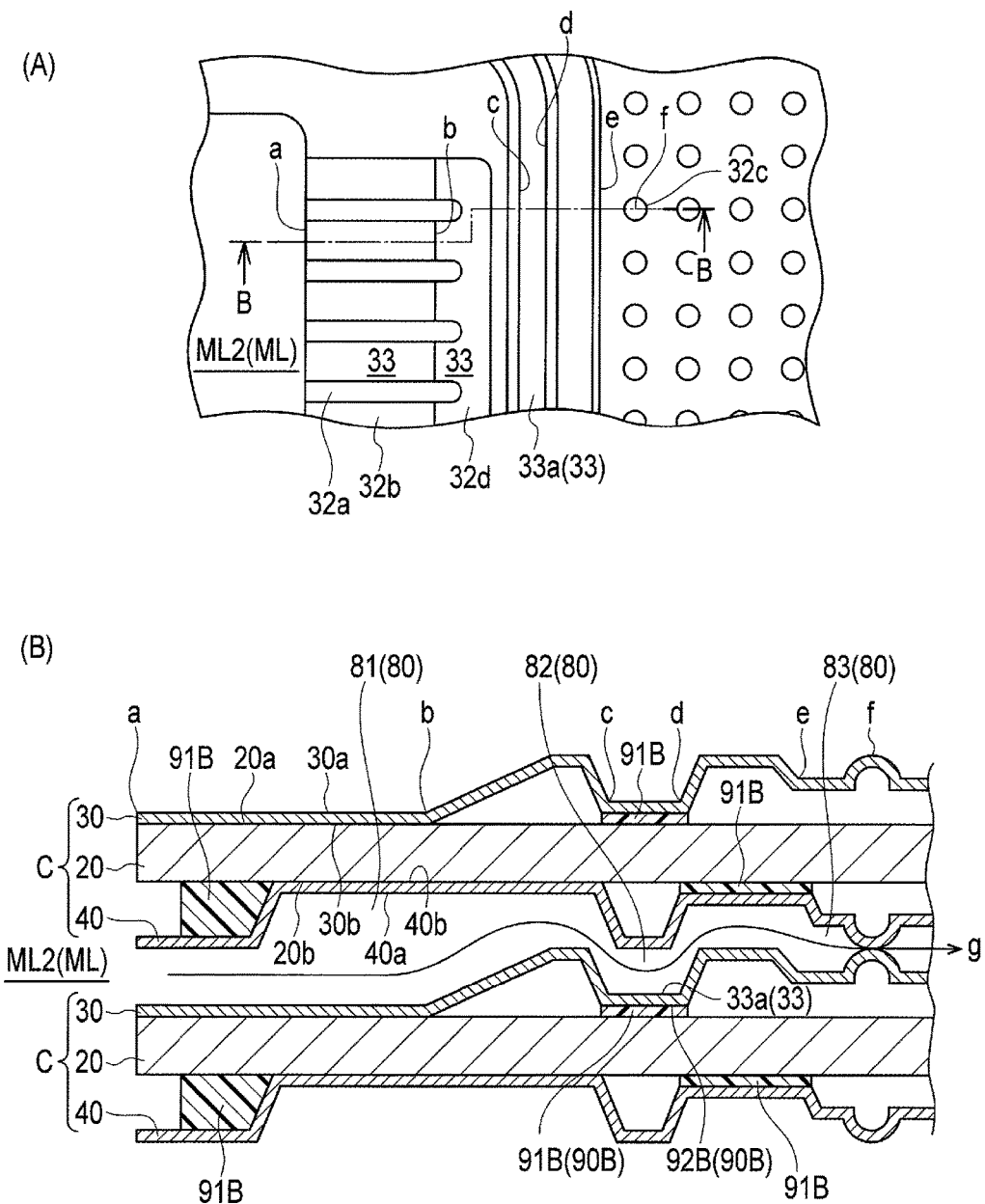
FIG. 6 is a view illustrating a coolant passage according to the first embodiment of the present invention.

According to the present embodiment, as shown in FIG. 6, the coolant passage 80 includes a narrowed portion 81 having a projection 32a and a recess 32b, and a common portion 82 common to the recess serving as the coolant seal portion 90B. The coolant passage 80 further includes a diffuser 83 for diffusing the coolant in the short-side direction, and a power generation portion cooling portion 84 for cooling the power generation portion 23.

The narrowed portion 81 corresponds to the a-c section of the coolant passage 80 shown in FIG. 6. The coolant supplied from the coolant introduction hole ML2 flows through the narrowed portion 81, so as to be rectified and led to the common portion 82.

The common portion 82 corresponds to the c-d section of the coolant passage 80 shown in FIG. 6. The passage in the common portion 82 extends in the vertical direction in FIG. 6A. Thus, while large part of the coolant entering the narrowed portion 81 and passing through the common portion 82 flows into the diffuser 83, part of the coolant flows in the vertical direction in FIG. 6A.

The diffuser 83 is part of the coolant passage 80 located on the right side of the sign d shown in FIG. 6 through which the narrowed portion 81 and the power generation portion cooling portion 84 communicate with each other.

The diffuser 83 diffuses the coolant entering through the narrowed portion 81 in the short-side direction (in the vertical direction in FIG. 6A) so as to lead the coolant to the power generation portion cooling portion 84. The region corresponding to the diffuser 83 of the separator 30 is provided with a plurality of hemispheric projections 32c projecting toward the adjacent separator, as indicated by the sign f shown in FIG. 6, so as to enhance the diffusion of the coolant flowing through the diffuser 83.

The power generation portion cooling portion 84 of the respective separators overlaps with the power generation portion 23 of the membrane electrode assembly 20, as viewed in the stacking direction. According to the present embodiment, the power generation portion cooling portion 84 is provided with a plurality of straight passages defined by recessed and projecting portions 31, 41 parallel to each other. The coolant passing through the power generation portion cooling portion 84 absorbs high-temperature heat generated by an exothermic reaction during the power generation in the power generation portion 23, so as to cool the power generation portion 23.

The coolant is supplied from the coolant introduction hole ML2 to the coolant passage 80, and flows through the common portion 82 into the recess 33a on the rear side of the coolant seal projection 92B formed on the coolant introduction hole ML2 side.

According to the present embodiment, the coolant seal projection 92B and the gas seal projection 92A adjacent to each other have the common projection. In other words, the recess 33a on the rear side of the coolant seal projection 92B communicates with the recess 33a on the rear side of the gas seal projection 92A. Thus, as shown in FIG. 7, there is a risk that the coolant flows into the recess 33a on the gas seal side to generate a side flow g2 bypassing the power generation portion cooling portion 84 and flowing toward the coolant discharge hole MR2.

Figure 7:
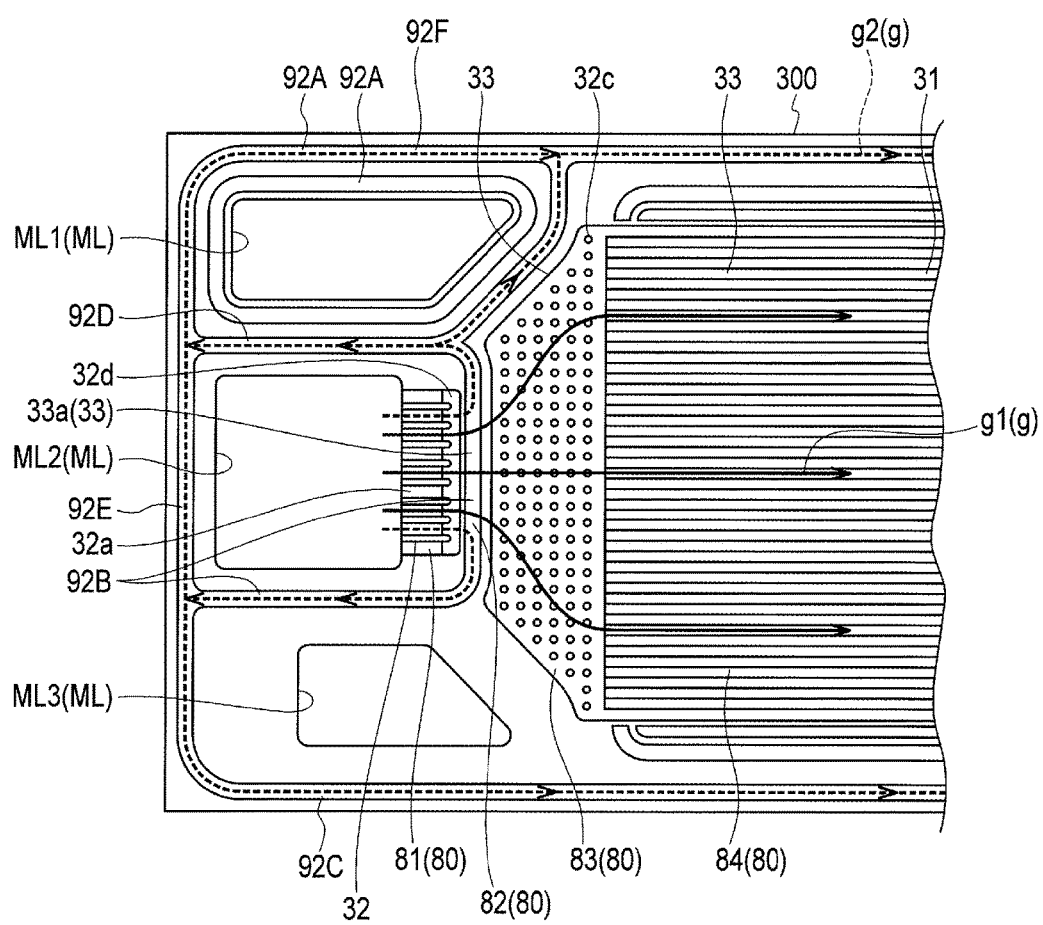
FIG. 7 is a partly-enlarged plan view of an anode-side separator according to a first comparative example.

The flow g of the coolant may be branched into the regular flow g1 passing through the power generation portion cooling portion 84 and the side flow g2 bypassing the power generation portion cooling portion 84 (refer to FIG. 7). The generation of the side flow g2 reduces the regular flow g1 of the coolant passing through the power generation portion cooling portion 84, which may decrease the efficiency of cooling the power generation portion 23.

The present embodiment suppresses the generation of the side flow g2 bypassing the power generation portion cooling portion 84 so as to minimize a reduction in the regular flow g1 of the coolant passing through the power generation portion cooling portion 84.

In particular, at least one of the gas seal projection 92A and the coolant seal projection 92B is provided with a resistance portion 50 to suppress the flow of the coolant out of the power generation portion cooling portion 84 (the side flow g2).

Figure 9:
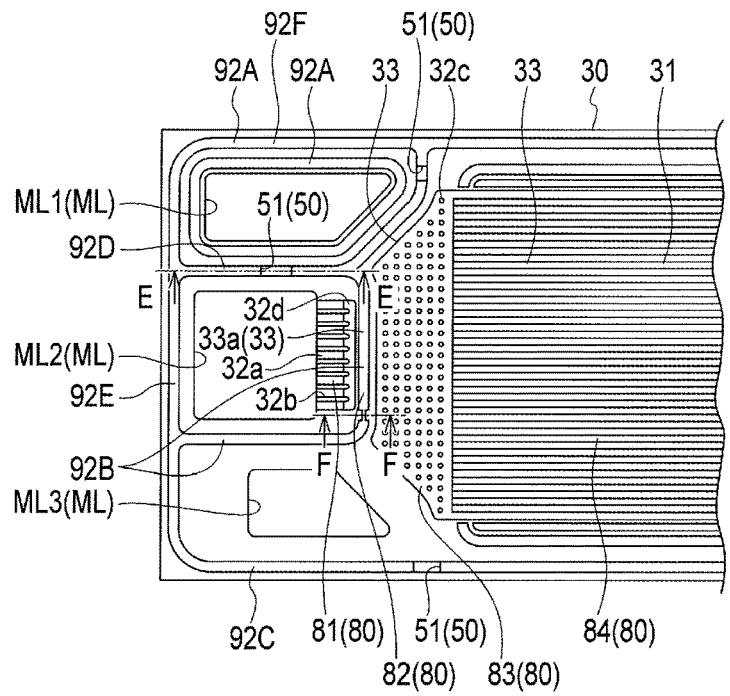
FIG. 9 is a view of the anode-side separator according to the first embodiment of the present invention.
Figure 9:
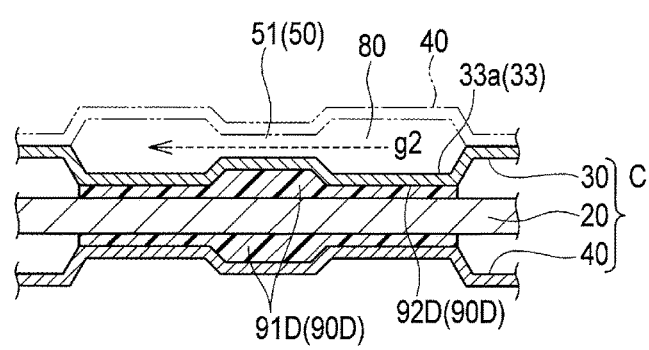
Figure 9:
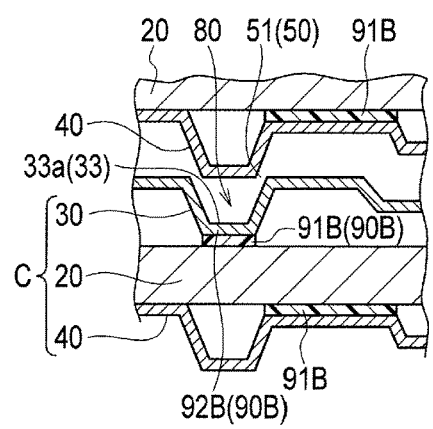

The present embodiment is illustrated with the case in which a contracted portion 51 (resistance portion 50) reducing the cross-sectional area of the passage is formed at both the gas seal projection 92A and the coolant seal projection 92B, as shown in FIG. 9. The contracted portion 51 can be formed such that the depth of the recess 33a formed on the rear side of the seal projection 92 is reduced or the width of the recess 33a is reduced.

In the present embodiment, the contracted portion 51 obtained such that the depth of the recess 33a is reduced is provided at the gas seal projection 92A, and the contracted portion 51 obtained such that the width of the recess 33a is reduced is provided at the coolant seal projection 92B located on the downstream side of the coolant introduction hole ML2 and extending in the short-side direction. The contracted portion 51 obtained such that the depth of the recess 33a is reduced is further provided at the periphery seal projection 92C.

Figure 8:
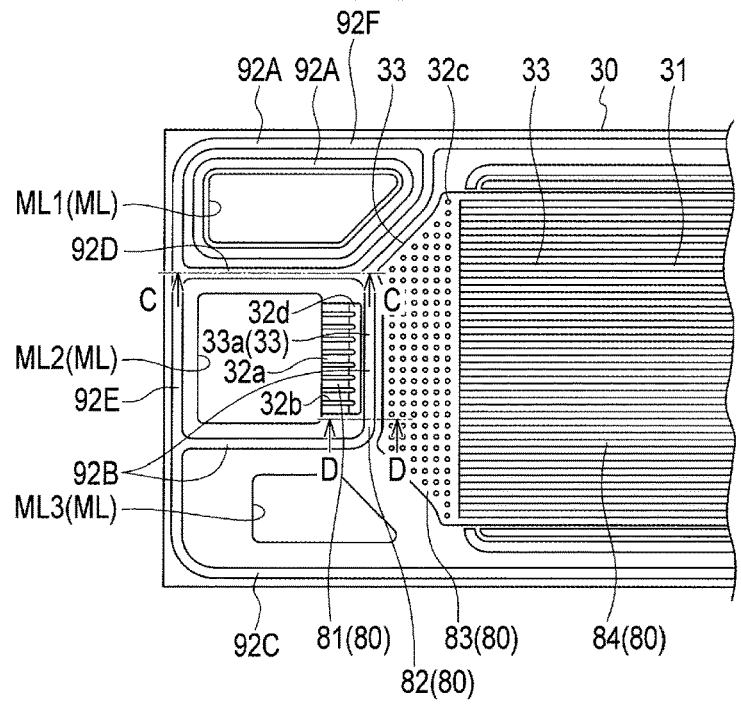
FIG. 8 is a view of the anode-side separator according to the first comparative example.
Figure 8:
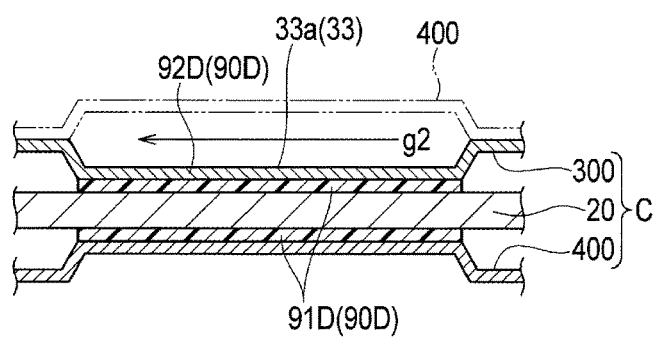
Figure 8:
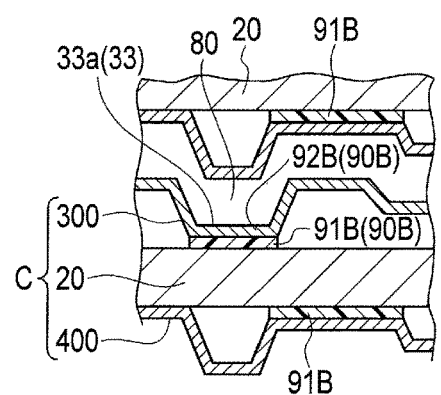

A separator 300 of Comparative Example 1 shown in FIG. 8 is not provided with any contracted portion 51 (resistance portion 50) at the seal projections 92, and the cross-sectional area of the passages at the recesses 33a formed on the rear side of the seal projections 92 is thus large. As a result, the coolant tends to flow through the recesses 33a formed on the rear side of the seal projections 92 to generate the side flow g2.

According to the present embodiment, the contracted portions 51 serving as the resistance portions 50 are provided at the seal projections 92. The cross-sectional area of the passages through which the coolant flows is reduced at the contracted portions 51 as compared with the cross-sectional area of the passages at the recesses 33a not provided with the contracted portions 51. The pressure loss is thus increased when the coolant passes through the recesses 33a formed on the rear side of the seal projections 92. Accordingly, the generation of the side flow g2 of the coolant can be suppressed, and the regular flow g1 of the coolant passing through the power generation portion cooling portion 84 is increased. The increase in the regular flow g1 of the coolant passing through the power generation portion cooling portion 84 can prevent a reduction in efficiency of cooling the power generation portion 23.

When the contracted portion 51 is formed such that the depth of the recess 33a is reduced, the adhesive seal material 91 is applied with a greater thickness between the membrane electrode assembly 20 and the separator 30.

As described above, the fuel cell stack FS according to the present embodiment includes the fuel cell modules M each including the fuel cells C stacked on one another, each fuel cell C including the membrane electrode assembly 20 having the power generation portion 23 and the two separators 30, 40 interposing the membrane electrode assembly 20.

The fuel cell C is provided with the gas introduction holes ML1, ML3 from which the power generation gas is introduced, the gas discharge holes MR1, MR3 from which the power generation gas is discharged, the coolant introduction hole ML2 from which the coolant is introduced, and the coolant discharge hole MR2 from which the coolant is discharged.

The power generation portion 23 is arranged between the two separators 30, 40 in the fuel cell C, and the gas passages 70 communicating with the gas introduction holes ML1, ML3 and the gas discharge holes MR1, MR3 are provided between the two separators 30, 40.

The fuel cell C is provided with the gas seal portions 90A for preventing the power generation gas from flowing out of the gas introduction holes ML1, ML3, the gas discharge holes MR1, MR3, and the gas passages 70, and the coolant seal portions 90B for preventing the coolant from flowing into a space between the separators 30, 40 and the membrane electrode assembly 20.

The coolant passages 80 communicating with the coolant introduction hole ML2 and the coolant discharge hole MR2 and including the power generation portion cooling portions 84 for cooling the power generation portions 23 are provided between the adjacent fuel cells C in the fuel cell module M.

The gas seal portions 90A include the gas seal projections 92A projecting toward the membrane electrode assembly 20 from at least one of the two separators 30, 40 in the fuel cell C and provided with the recesses 33a serving as the coolant passages 80 on the side opposite to the membrane electrode assembly 20.

The coolant seal portions 90B include the coolant seal projections 92B projecting toward the membrane electrode assembly 20 from at least one of the two separators 30, 40 in the fuel cell C and provided with the recesses 33a serving as the coolant passages 80 on the side opposite to the membrane electrode assembly 20.

At least one of the gas seal projections 92A and the coolant seal projections 92B is provided with the resistance portion 50 for suppressing the flow of the coolant out of the power generation portion cooling portion 84.

According to the present embodiment, since the recesses 33a formed on the rear side of the seal projections 92 serve as the coolant passages 80, an extra space for providing the seal projections 92 is not required. Accordingly, a reduction in size of the separators 30, 40 can be ensured, which reduces the size of the fuel cell stack FS.

At least one of the gas seal projections 92A and the coolant seal projections 92B is provided with the resistance portion 50 for suppressing the flow of the coolant out of the power generation portion cooling portion 84 (the side flow g2). Accordingly, a larger amount of the coolant flows through the power generation portion cooling portion 84, so as to prevent a reduction in cooling efficiency more reliably.

The present embodiment can provide a fuel cell stack with a size reduced which achieves prevention of a reduction in cooling efficiency more reliably.

According to the present embodiment, the resistance portion 50 increase the pressure loss when the coolant flows through the recess 33a to suppress the flow of the coolant.

The increase in the pressure loss when the coolant flows through the recess 33a formed on the rear side of the seal projection 92 can suppress the side flow g2 of the coolant to increase the regular flow g1 of the coolant passing through the power generation portion cooling portion 84.

According to the present embodiment, the contracted portion 51 serving as the resistance portion 50 is provided at the gas seal projections 92A or the coolant seal projections 92B.

The contracted portion 51 can increase the pressure loss when the coolant flows through the recess 33a formed on the rear side of the seal projection 92, so as to suppress the side flow g2 of the coolant. Accordingly, a reduction in efficiency of cooling the power generation portion 23 is prevented.

[Second Embodiment]

A separator 30A according to the present embodiment is also provided with the resistance portion 50 for suppressing the flow of the coolant out of the power generation portion cooling portion 84 (the side flow g2) in at least one of the gas seal projection 92A and the coolant seal projection 92B.

The present embodiment differs from the first embodiment in that a bent portion 52 serving as the resistance portion 50 is provided in at least one of the gas seal projection 92A and the coolant seal projection 92B.

Figure 10:
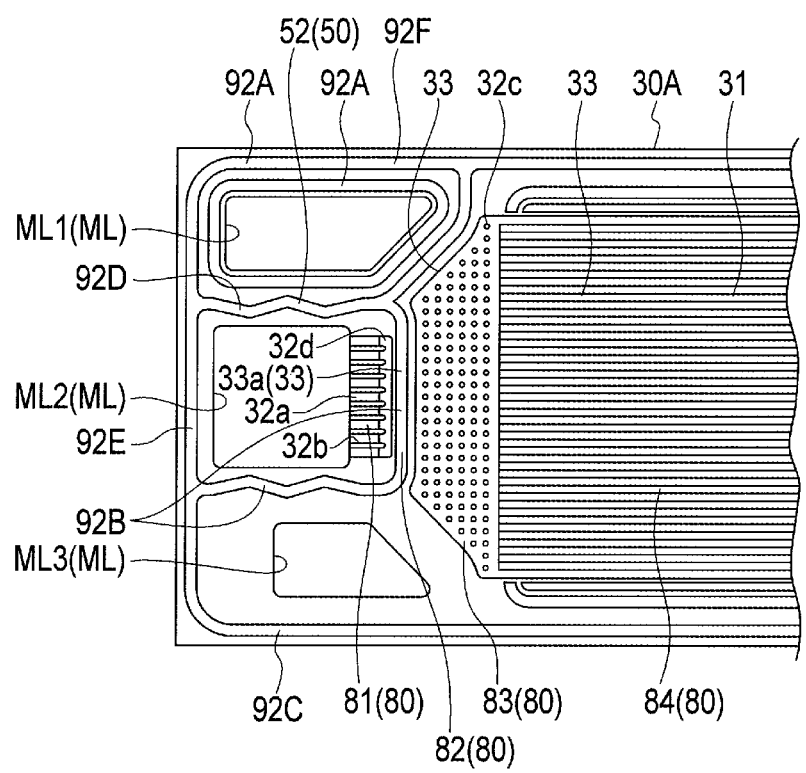
FIG. 10 is a partly-enlarged plan view of an anode-side separator according to a second embodiment of the present invention.

According to the present embodiment, as shown in FIG. 10, part of the coolant seal projection 92B is bent in a zigzag manner to provide the bent portion 52.

The resistance portion 50 having such a configuration can increase the pressure loss when the coolant flows through the recess 33a formed on the rear side of the seal projection 92, so as to suppress the side flow g2 of the coolant.

[Third Embodiment]

A separator 30B according to the present embodiment is also provided with the resistance portion 50 for suppressing the flow of the coolant out of the power generation portion cooling portion 84 (the side flow g2) in at least one of the gas seal projection 92A and the coolant seal projection 92B.

Figure 12:
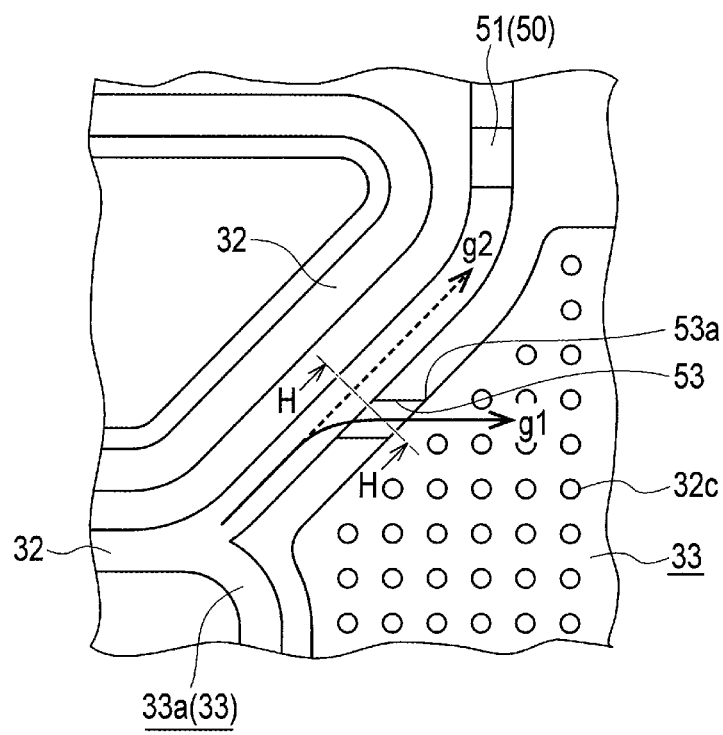
FIG. 12 is a view of an anode-side separator according to a third embodiment of the present invention.
Figure 12:
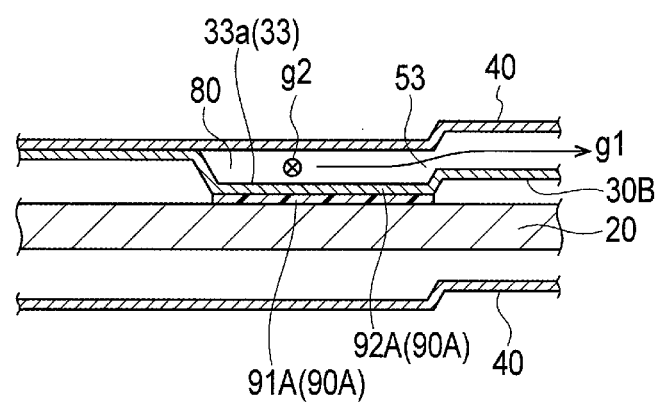

According to the present embodiment, as shown in FIG. 12, the separator 30 is provided with a second recess 53 communicating with the recess 33a and changing the flow of the coolant out of the power generation portion cooling portion 84 to the flow toward the power generation portion cooling portion 84.

The second recess 53 can return the flow of the coolant out of the power generation portion cooling portion 84 to the flow toward the power generation portion cooling portion 84.

According to the present embodiment, the resistance portion 50 is further provided in the recess 33a on the downstream side of a connected portion 53a between the recess 33a and the second recess 53.

Figure 11:
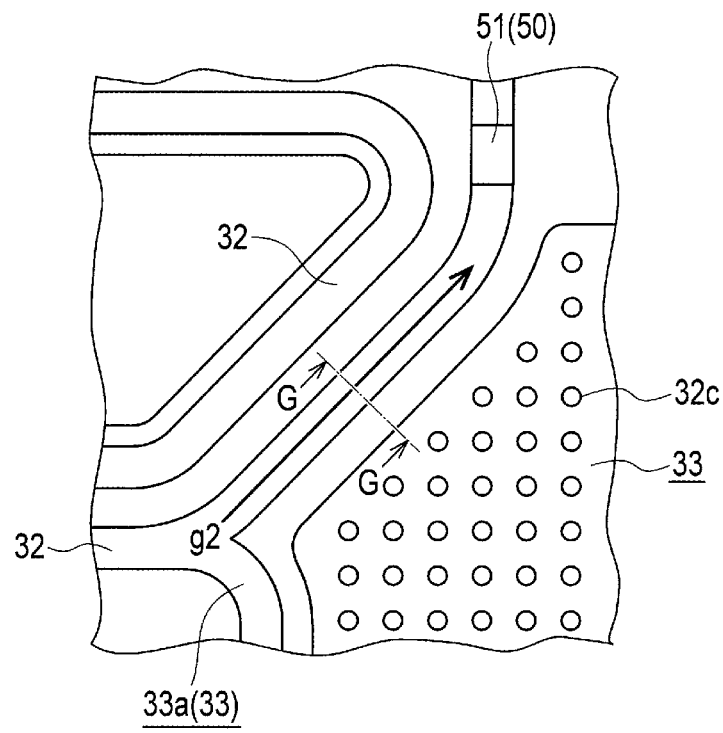
FIG. 11 is a view of an anode-side separator according to a second comparative example.
Figure 11:
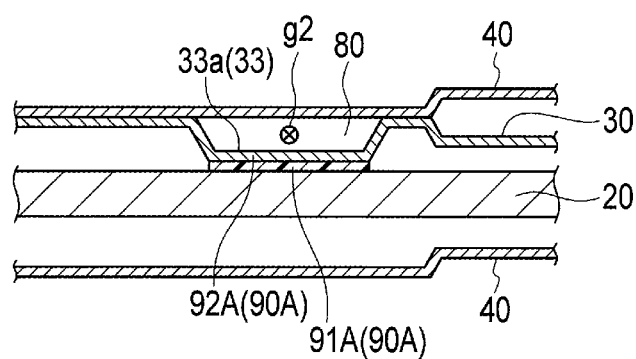

As illustrated in Comparative Example 2 shown in FIG. 11, it is difficult to return the side flow g2 of the coolant to the regular flow g1 efficiently, since the resistance portion 50 merely suppresss the side flow g2 of the coolant.

According to the present embodiment, as shown in FIG. 12, the recess 33a communicates with the second recess 53 for changing the flow of the coolant out of the power generation portion cooling portion 84 to the flow toward the power generation portion cooling portion 84. Accordingly, the second flow g2 of the coolant can be returned to the regular flow g1 more efficiently.

According to the present embodiment, the resistance portion 50 is further provided in the recess 33a on the downstream side of the connected portion 53a between the recess 33a and the second recess 53. Accordingly, the coolant tends to remain around the second recess 53, so as to return the side flow g2 to the regular flow g1 more efficiently.

[Fourth Embodiment]

A separator 30C according to the present embodiment is also provided with the resistance portion 50 for suppressing the flow of the coolant out of the power generation portion cooling portion 84 (the side flow g2) in at least one of the gas seal projection 92A and the coolant seal projection 92B.

Figure 14:
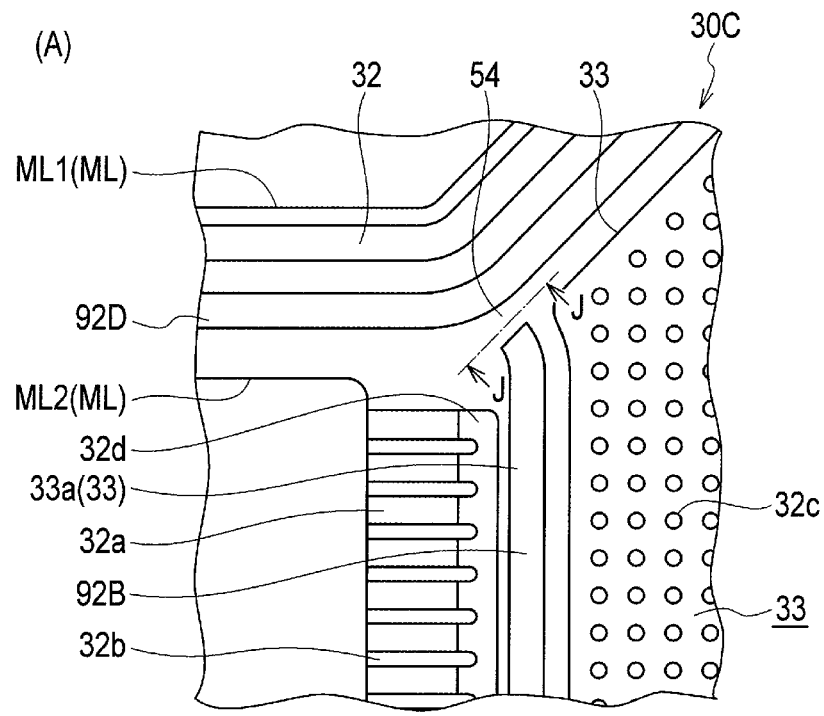
FIG. 14 is a view of an anode-side separator according to a fourth embodiment of the present invention.
Figure 14:
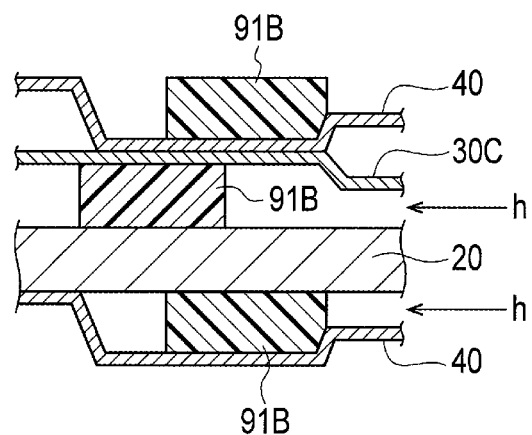

According to the present embodiment, as shown in FIG. 14, the resistance portion 50 has a block portion 54 which blocks the communication between the recesses 33a.

According to the present embodiment, the separator 30 is provided with a flat section at which the recess 33a is not provided so as to form the block portion 54.

In particular, as shown in FIG. 14, the block portion 54 is provided on the downstream side of the gas seal projection 92A and the coolant introduction hole ML2 at a connected portion between the coolant seal projection 92B extending in the short-side direction and the gas seal projection 92A.

Figure 13:
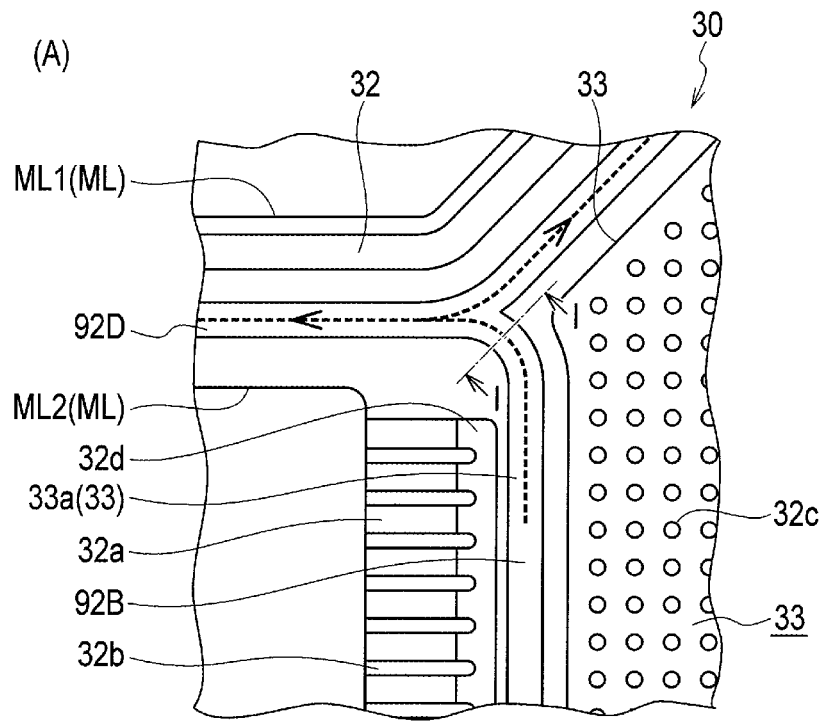
FIG. 13 is a view of an anode-side separator according to a third comparative example.
Figure 13:
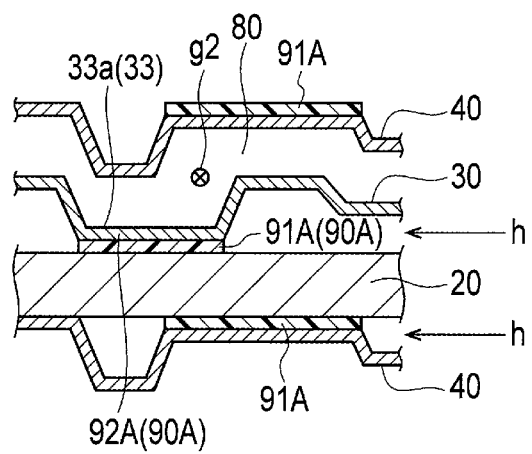

As shown in FIG. 13, when the recesses 33a formed on the rear side of the seal projections 92 communicate with each other, it is difficult to suppress the side flow g2 of the coolant.

According to the present embodiment, the resistance portion 50 has the block portion 54 which blocks the communication between the respective recesses 33a.

This configuration can block the deviation of the coolant flowing into the recesses 33a, so as to prevent the side flow g2 of the coolant. Accordingly, the regular flow g1 of the coolant passing through the power generation portion cooling portion 84 can be increased, so as to prevent a decrease in cooling efficiency more reliably.

When the separator 30 is provided with a flat section at which part of the recess 33a is not provided so as to form the block portion 54 as in the case of the present embodiment, the gas seal or the coolant seal at the block portion 54 should be formed only of the adhesive seal material. As a result, the holding force of the adhesive seal material may be reduced because of the pressure h of the power generation gas or the coolant generated between the membrane electrode assembly 20 and the separators 30, 40.

Figure 15:
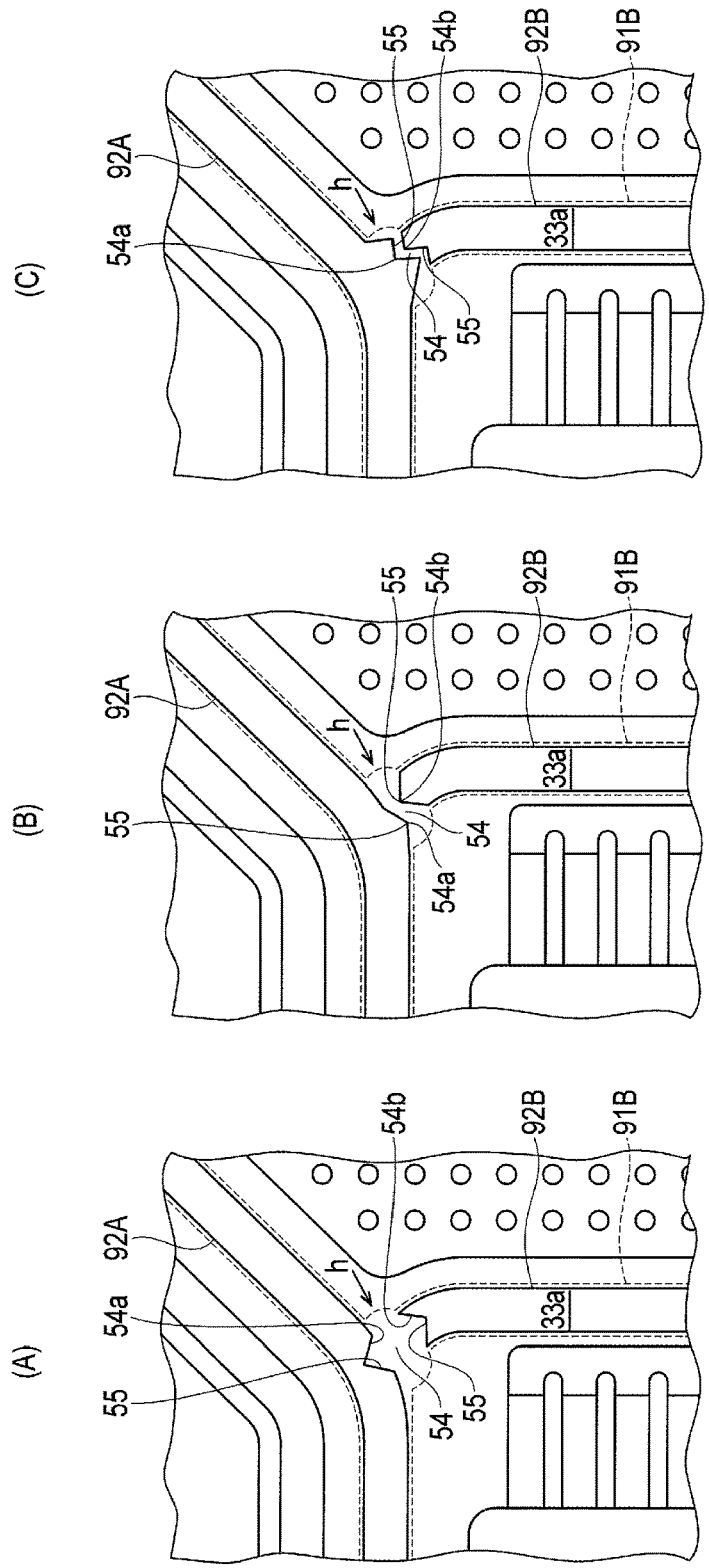
FIG. 15 is a view of an anode-side separator according to a modified example of the fourth embodiment of the present invention.

In view of this, as shown in FIG. 15, at least one of a start point 54a and an end point 54b of the block portion 54 at the gas seal projection 92A or the coolant seal projection 92B may be provided with a holding portion 55 for holding the adhesive seal material 91 formed between the membrane electrode assembly 20 and the separators 30, 40.

FIG. 15A illustrates the holding portion 55 formed such that the start point 54a and the end point 54b of the block portion 54 are both cut into a rectangular shape. This holding portion 55 allows the adhesive seal material 91 to be caught on the start point 54a and the end point 54b. Accordingly, a reduction in the holding force of the adhesive seal material 91 can be prevented when the pressure h of the gas is applied to the gas seal portion in the flat section between the membrane electrode assembly 20 and the separators 30, 40.

FIG. 15B illustrates the holding portion 55 formed such that the start point 54a and the end point 54b squeeze and hold the adhesive seal material 91 therebetween.

This holding portion 55 can also prevent a reduction in the holding force of the adhesive seal material 91.

FIG. 15C illustrates the holding portion 55 formed such that the start point 54a and the end point 54b are bent in a zigzag manner.

This holding portion 55 can also prevent a reduction in the holding force of the adhesive seal material 91.

The configuration of the start point and the end point is not limited to the illustrations above, and various configurations that can increase the holding force of the adhesive seal material may be employed.

While the fuel cell stack according to the present invention has been described above with reference to the respective embodiments, the present invention is not limited to those embodiments, and various embodiments may be adopted without departing from the scope of the present invention.

For example, the resistance portions described in the respective embodiments may be combined together, or the position of the respective resistance portions may be determined as appropriate.

The configuration, the number, the arrangement position, and the material of the respective elements may be varied as appropriate.

INDUSTRIAL APPLICABILITY

The present invention can provide a fuel cell stack with a size reduced which achieves prevention of a reduction in cooling efficiency more reliably.

REFERENCE SIGNS LIST

FS FUEL CELL STACK
M FUEL CELL MODULE
C FUEL CELL
20 MEMBRANE ELECTRODE ASSEMBLY
23 POWER GENERATION PORTION
30, 30A, 30B, 30C ANODE-SIDE SEPARATOR
33a RECESS
40 CATHODE-SIDE SEPARATOR
50 RESISTANCE PORTION
51 CONTRACTED PORTION
52 BENT PORTION
53 SECOND RECESS
54 BLOCK PORTION
54a START POINT
54b END POINT
55 HOLDING PORTION
70 GAS PASSAGE
80 COOLANT PASSAGE
84 POWER GENERATION PORTION COOLING PORTION
90 SEAL PORTION
90A GAS SEAL PORTION
90B COOLANT SEAL PORTION
91 SEAL MATERIAL
92 SEAL PROJECTION
92A GAS SEAL PROJECTION
92B COOLANT SEAL PROJECTION
ML1 OXYGEN-CONTAINING GAS INTRODUCTION HOLE (GAS INTRODUCTION HOLE)
ML2 COOLANT INTRODUCTION HOLE
ML3 HYDROGEN-CONTAINING GAS INTRODUCTION HOLE (GAS INTRODUCTION HOLE)
MR1 OXYGEN-CONTAINING GAS DISCHARGE HOLE (GAS DISCHARGE HOLE)
MR2 COOLANT DISCHARGE HOLE
MR3 HYDROGEN-CONTAINING GAS DISCHARGE HOLE (GAS DISCHARGE HOLE)

The invention claimed is:

1. A fuel cell stack comprising a fuel cell module including fuel cells stacked on one another, each fuel cell including a membrane electrode assembly having a power generation portion and two separators interposing the membrane electrode assembly,
    each fuel cell including a gas introduction hole from which power generation gas is introduced, a gas discharge hole from which the power generation gas is discharged, a coolant introduction hole from which a coolant is introduced, and a coolant discharge hole from which the coolant is discharged,
    the two separators in each fuel cell interposing the power generation portion and being provided therebetween with a gas passage communicating with the gas introduction hole and the gas discharge hole,
    each fuel cell including a gas seal portion for preventing the power generation gas from flowing out of the gas introduction hole, the gas discharge hole, and the gas passage, and a coolant seal portion for preventing the coolant from flowing into a space between the separators and the membrane electrode assembly,
    the fuel cells adjacent to each other in the fuel cell module being provided therebetween with a coolant passage which communicates with the coolant introduction hole and the coolant discharge hole and has a power generation portion cooling portion for cooling the power generation portion,
    the gas seal portion including a gas seal projection which projects from at least one of the two separators toward the membrane electrode assembly in each fuel cell and said gas seal portion is provided with a recess serving as the coolant passage on a side opposite to the membrane electrode assembly,
    the coolant seal portion including a coolant seal projection which projects from the at least one of the two separators toward the membrane electrode assembly in each fuel cell and said coolant seal portion is provided with a recess serving as the coolant passage on the side opposite to the membrane electrode assembly,
    at least one of the gas seal projection and the coolant seal projection being provided with a resistance portion configured to suppress a flow of the coolant out of the power generation portion cooling portion.

2. The fuel cell stack according to claim 1, wherein the resistance portion increases a pressure loss generated when the coolant passes through the recess to suppress the flow of the coolant.

3. The fuel cell stack according to claim 1, wherein the resistance portion includes a contracted portion formed at the gas seal projection or the coolant seal projection.

4. The fuel cell stack according to claim 1, wherein:
    the at least one of the two separators is provided with a second recess for changing the flow of the coolant out of the power generation portion cooling portion to a flow toward the power generation portion cooling portion; and
    the resistance portion is provided in the recess on a downstream side of a connected portion between the recess and the second recess.

5. The fuel cell stack according to claim 1, wherein the resistance portion includes a block portion for blocking a communication between the recesses.

6. The fuel cell stack according to claim 5, wherein at least one of a start point and an end point of the block portion at the gas seal projection or the coolant seal projection is provided with a holding portion for holding an adhesive seal material provided between the membrane electrode assembly and the least one of the separators.

* * * * *